June 4, 1957  H. B. SEDGFIELD ET AL  2,794,975
ISOGONAL ERROR DETECTING SYSTEM, INCLUDING TWO
REFERENCE DEVICES PROVIDING POSITIONAL
DATA OF THE SAME CHARACTER
Filed May 26, 1954  6 Sheets-Sheet 2

INVENTORS
HUGH B. SEDGFIELD, ALAN H. GREENHALGH,
ARTHUR P. GLENNY, FRANK DOVE
BY
Herbert A. Thompson
ATTORNEY June 4, 1957   H. B. SEDGFIELD ET AL   2,794,975
ISOGONAL ERROR DETECTING SYSTEM, INCLUDING TWO
REFERENCE DEVICES PROVIDING POSITIONAL
DATA OF THE SAME CHARACTER
Filed May 26, 1954   6 Sheets-Sheet 6

INVENTORS
HUGH B. SEDGFIELD, ALAN H. GREENHALGH,
ARTHUR P. GLENNY, FRANK DOVE
BY
Herbert R. Thompson
ATTORNEY United States Patent Office 2,794,975
Patented June 4, 1957

2,794,975

ISOGONAL ERROR DETECTING SYSTEM, IN-
CLUDING TWO REFERENCE DEVICES PRO-
VIDING POSITIONAL DATA OF THE SAME
CHARACTER

Hugh Brougham Sedgfield, Hampton, Alan Henry Green-
halgh, Leicester, Arthur Philip Glenny, Hanworth, and
Frank Dove, St. Albans, England, assignors to The
Sperry Gyroscope Company Limited, Brentford, Eng-
land, a company of Great Britain Application May 26, 1954, Serial No. 432,554

Claims priority, application Great Britain May 28, 1953

1 Claim. (Cl. 340—268)

This invention relates to an isogonal error detecting system including two reference devices providing positional data of the same character.

The positional data devices of the system may be provided by gyroscopic apparatus which includes a rotor mounted for spinning in a rotor-bearing frame which is itself mounted for angular freedom of movement about at least two mutually perpendicular axes relatively to a support or housing. It is well known to those skilled in the art that, if the spin axis of the rotor is pointed in a predetermined set direction in space, it will remain pointed in this direction in the absence of disturbing torques applied directly or indirectly to the rotor bearing frame, causing it to precess away from the predetermined direction. It is more or less impossible to avoid some disturbing torques, so that it is difficult to construct gyroscopic apparatus in which the rotor will maintain its spin axis pointing in a predetermined set direction in space for any appreciable length of time and, moreover, it is frequently desirable that the axis should remain pointing in a predetermined set direction relative to earth axes rather than to space axes. Consequently arrangements are usually provided for slaving or monitoring the gyroscopic apparatus from a primary reference device which in the case of an azimuth reference system may be a magnetic-field-responsive device such as a flux valve. For this purpose means are provided for applying precessional torques to the rotor-bearing frame from the support to precess the rotor in the direction necessary to reduce any discrepancy between the actual direction of its spin axis and the desired direction.

The gyroscopic apparatus may be arranged to provide indications of the relative angular position of the spin axis of the gyroscope rotor and the support or housing in which the apparatus is carried. The angle indicated may lie either in the horizontal plane or in a vertical plane. The indications may be provided directly by means of a pointer and a scale attached to the rotor-bearing frame and the support, but it is frequently desirable that the indications should be provided at a point or points remote from the gyroscopic apparatus itself. In such cases arrangements must be provided for transmitting data concerning the relative angular position of the rotor-bearing frame and the support to the remote points. A data transmitter operated directly from the rotor-bearing frame may produce excessive disturbing torques on the rotor-bearing frame, causing it to wander, especially when more than one remote indicator is used. For this reason a relay transmitter may be provided having a shaft the angular position of which relative to a datum position is controlled by a servo system to correspond to the angular position of the rotor-bearing frame relative to the support, and which drives a data transmitter to provide data for controlling the remote indicators. The relay transmitter shaft may be driven by a servomotor controlled in accordance with an error signal provided by a synchro receiver whose rotor is turned by the relay transmitter shaft and whose stator receives data from a synchro transmitter driven by the rotor-bearing frame or a data shaft associated with it. As the relay transmitter shaft follows the rotor-bearing frame, it may itself be used as an indicator and for this purpose may be provided with e. g. a compass card. By the term synchro transmitter we hereinafter mean a unit the rotor of which is mechanically driven for generating or transmitting electrical signals corresponding to the angular position of the said rotor. By the term synchro receiver we mean a unit producing a single-phase voltage whose magnitude is proportional to the sine of the angle of rotation of its rotor with respect to the magnetic field of its stator.

When the gyroscopic element is slaved or monitored from a primary reference device, the relay transmitter may also operate as a comparator for comparing the angular position of the gyroscopic element, or its associated data shaft, with the indications provided by the primary reference device. For this purpose a transmitter synchro is mounted so that its rotor is turned by the relay transmitter shaft, while its stator receives the output signals of the primary reference device. As a result an error signal is produced and this is used to precess the gyroscope to maintain its spin axis in the desired direction.

In some cases, particularly in azimuth-indicating instruments, it may be desirable to provide duplicate systems as a safety precaution. The object of the present invention is to provide means for providing a warning signal if the azimuth shafts of the two equipments of a duplicate system differ in their production of angular movement about a reference, this difference we term hereinafter error of isogonalisation where the term isogonalisation means the production of equal angles by two or more rotating reference lines in relation to a fixed reference line or lines, all the lines being radially disposed about the centre or centres of rotation.

According to the invention we provide a system comprising first and second identical indicating instruments having rotating indication elements and means for providing a warning signal operated in direct or indirect dependence on the error of isogonalisation between the said rotating indicating elements.

According to the invention we further provide a system comprising first and second gyroscopic elements, first and second relay transmitters for transmitting data to control first and second (or a plurality of) remote indicators, the first relay transmitter and the first remote indicator each having a shaft the angular position of which is controlled to correspond to the angular position of the first gyroscopic element, or a data shaft associated with it and the second relay transmitter and the second remote indicator each having a shaft the angular position of which is controlled to correspond to the angular position of the second gyroscopic element, or a data shaft associated with it, and means for providing a warning signal operated in direct or indirect dependence on the error of isogonalisation between said shafts in the first and second relay transmitters or said shafts in the first and second remote indicators.

The invention is particularly applicable to azimuth reference systems in which case the gyroscopic element may be part of some form of gyromagnetic compass.

In one form of the invention the first and second relay transmitters may have their azimuth shafts coupled mechanically to a differential or alternatively coupled differentially to an electric signal transmitter which transmits a signal when any error of isogonalisation between the two azimuth shafts occurs. The two azimuth shafts may be mounted co-axially so that the angular position of the two shafts may be compared directly by the signal transmitter. This signal transmitter may be a switch having one contact or set of contacts mounted on one shaft and a co-operating contact or set of contacts mounted on the other shaft. Alternatively it may comprise an inductive pick-off, such as a synchro transmitter used as a variable transformer, having its stator mounted on one shaft and its rotor mounted on the other shaft.

In an alternative form of the invention a first synchro transmitter may have its rotor driven by the azimuth shaft of the first relay transmitter and a second synchro transmitter may have its rotor driven by the azimuth shaft of the second relay transmitter, the signal outputs of the two synchro transmitters being coupled to a differential synchro the rotor of which moves in dependence on the error of isogonalisation between the two azimuth shafts to operate an indicator or warning device.

In yet another form of the invention the means for providing the warning signal may be operated in dependence on error of isogonalisation between the indicating azimuth shafts of the remote indicators of a duplex system, where indicators are provided at a plurality of different stations, a warning signal may be provided at any station at which error of isogonalisation between the remote indicators occurs. Preferably, however, a warning indication is provided at all the stations when error of isogonalisation occurs between any pair of remote indicators. Alternatively, or in addition, a common warning indicator may be operated on the occurrence of error of isogonalisation between any pair of remote indicators. As in the first form of the invention the warning signal is produced by a signal transmitter which may be in the form of a switch. Preferably signal transmitters are provided at each station and if these transmitters are switches that operate each to make a contact on the occurrence of the error of isogonalisation all the switches are connected in parallel. Similarly if the transmitters are switches that operate each to break a contact on the occurrence of error of isogonalisation, the switches are connected in series.

In a further form of the invention it may be advantageous to use two synchros which are identical and fitted in an identical manner to their respective shafts either one of the synchros being used as a synchro transmitter and the other as a synchro receiver to give an error signal as an output voltage proportional to the error of isogonalisation of the two shafts to which the rotors of the synchros are fixed. In operation one synchro is used as a transmitter, an angular change of 90° being added externally to the signal derived from the stator of the transmitter, prior to its injection into the stator of the other identical synchro—the receiver synchro. The rotor coil of the receiver synchro will give zero volts output when the shafts carrying the rotors of the two synchros have no error of isogonalisation and an error voltage proportional in most cases to the sine of the angular error of isogonalisation. The angular change of 90° which the signal from the first stator suffers prior to its injection into the second stator may be provided by a differential synchro in which its three space-phase star-connected stator and its space-phase star-connected rotor have their windings out of alignment by 90°. Alternatively the angular change of 90° may be effected by using three similar auto-transformers delta connected. A further arrangement is envisaged in that each of the two shafts about which error of isogonalisation is to be found are provided with a synchro having a two-phase resolver-stator the phases of the said synchros being crossed over in the connection between the said two stators to give the angular change of 90° to the signal from one stator prior to its injection into the other stator. Yet a further arrangement may be employed, the 90° change being effected by using a two phase rotor and three phase stator in each syncho, the rotor's four terminals being brought out for selective wiring and the energisation of one phase of the said two phase winding.

The invention will be more readily appreciated from the following description reference being had to the figures of the drawing.

Fig. 1a is the same system using an electrical differential;

Figure 1:
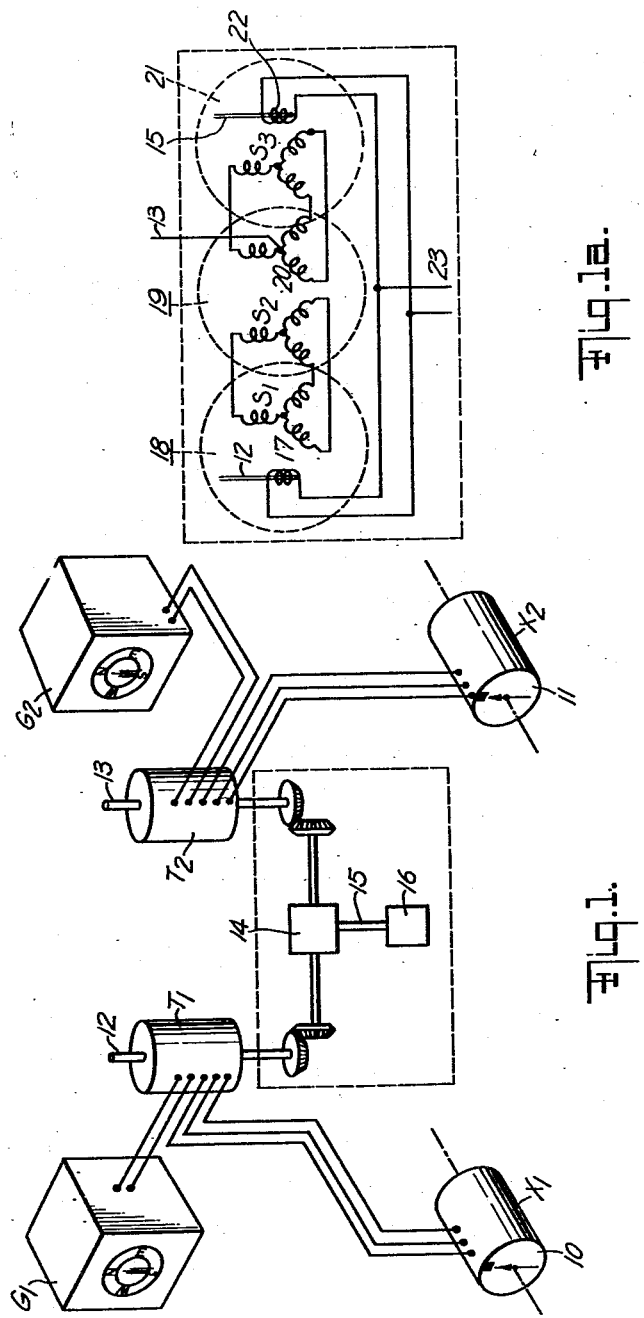
Fig. 1 is a schematic view of an azimuth reference system using two gyromagnetic compasses in one craft, the error of isogonalisation of the azimuth shafts being evaluated by a mechanical differential.

Referring now specifically to Fig. 1 a gyro compass $G_1$ provides azimuthal data regarding the relative angular position of its rotor-bearing frame and the support (not shown) to the transmitter $T_1$ which in turn provides data for controlling the position of the compass card 10 of the remote indicator $X_1$. Similarly on the same craft a gyro compass $G_2$ provides azimuthal data regarding the relative angular position of its rotor-bearing frame and the support (not shown) to the transmitter $T_2$ which in turn provides data for controlling the position of the compass card 11 of the remote indicator $X_2$. It is desirable in such duplicate systems to arrange for means which will provide a warning signal or an error indication if the azimuth shafts of the two equipments of the duplicate systems have an error of isogonalisation. This desideratum is effected in Fig. 1 by arranging for the azimuth shafts 12 and 13 of transmitters $T_1$ and $T_2$ to be coupled as input to a mechanical differential 14, the output shaft 15 of which actuates a visual (or audible) indicating instrument 16, thus providing a measure of the error of isogonalisation of the two azimuth shafts 12 and 13. It will be readily appreciated by those skilled in the art that in place of a mechanical differential an electrical differential may be used and this is shown in Fig. 1a. This electrical differential may be substituted for the integers in the dotted rectangle of Fig. 1. Azimuth shaft 12 drives rotor 17 of a synchro transmitter depicted by the dotted circle 18. A stator $S_1$ of synchro transmitter 18 is connected to a stator $S_2$ of a differential synchro transmitter 19 which is electrically connected to the stator $S_1$. A three-space-phase star-connected rotor 20 is driven by the azimuth shaft 13 of transmitter $T_2$ and this rotor is electrically connected to a stator $S_3$ of a synchro receiver 21. A rotor 22 of synchro receiver 21 provides a differential output on a shaft 15 corresponding to the shaft 15 of Fig. 1. The rotors 17 and 22 are supplied from a common alternating single phase supply shown at 23.

Figure 2:
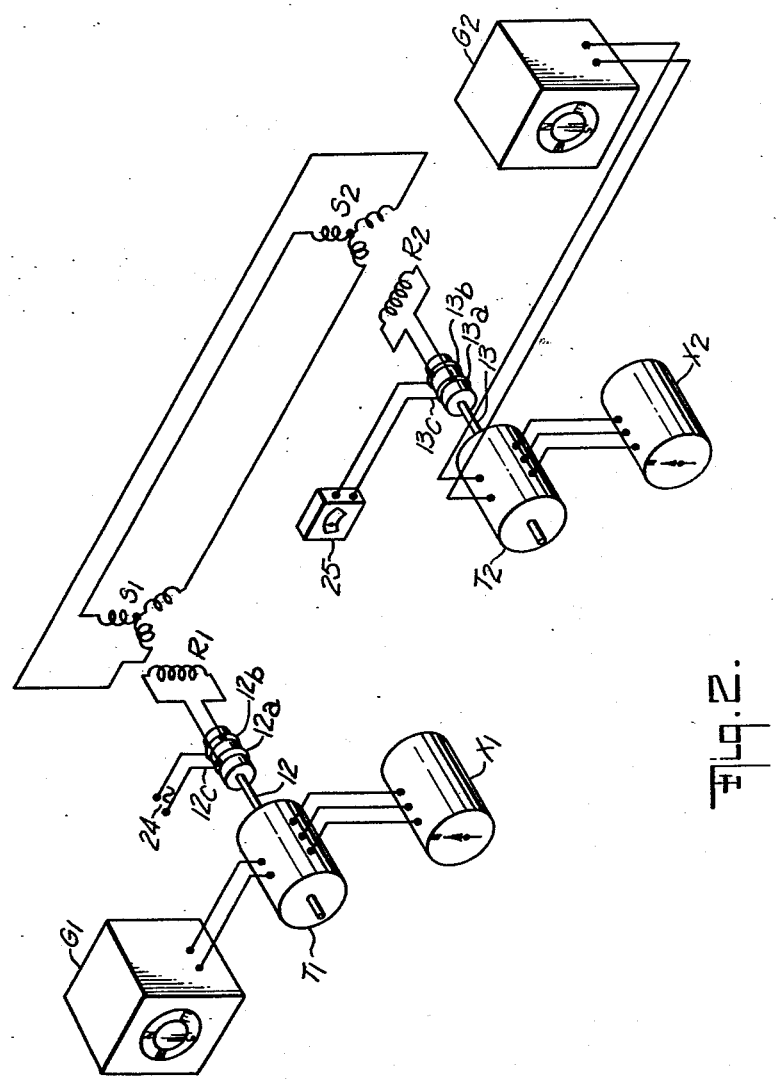
Fig. 2 is a schematic view of a similar system to that of Fig. 1 in which the error of isogonalisation is evaluated by a control transformer.

It will be appreciated that the output shaft 15 of Figs. 1 and 1a is a mechanical output. If an electrical output denoting error of isogonalisation is desired, then an arrangement such as that shown in Fig. 2 may be used. Again a duplicate system comprising gyro compasses $G_1$, $G_2$, transmitters $T_1$, $T_2$, and remote indicators $X_1$, $X_2$ is provided. The azimuth shafts 12 and 13 of the transmitters $T_1$, $T_2$ are provided with slip rings 12a, 12b, 13a, 13b. Brushes 12c connected to an alternating single phase supply 24 energises the rotor $R_1$. Stator $S_1$ provides three line voltages which vary sinusoidally with the position of rotor R₁. The stator S₁ and rotor R₁ constitute a synchro transmitter and the three line voltages of stator S₁ are supplied to a stator S₂ thereby producing the direction of the transmitter flux of S₁ in stator S₂. The stator flux of stator S₂ links the rotor R₂ which acts as a transformer generating a signal voltage which is proportional to the sine of the error of isogonalisation between shafts 12 and 13. This voltage is received on slip rings 13a, 13b and the signal is conveyed via the brushes 13c to an error indicator 25. If the azimuth shafts 12 and 13 have no error of isogonalisation when the rotors R₁ and R₂ have their axes set 90° apart as shown in Fig. 2 R₁ is vertical when R₂ is horizontal then zero voltage appears on the slip rings 13a and 13b. Should the azimuth shafts 12 and 13, however, produce an error of isogonalisation, then this error will be electrically indicated on the error indicator 25 which may conveniently be a moving coil instrument having a centre zero indicating no error of isogonalisation. Alternatively it may be a visual or audible warning set to operate above a predetermined threshold value of the signal appearing on the slip rings 13a, 13b.

Figure 3:
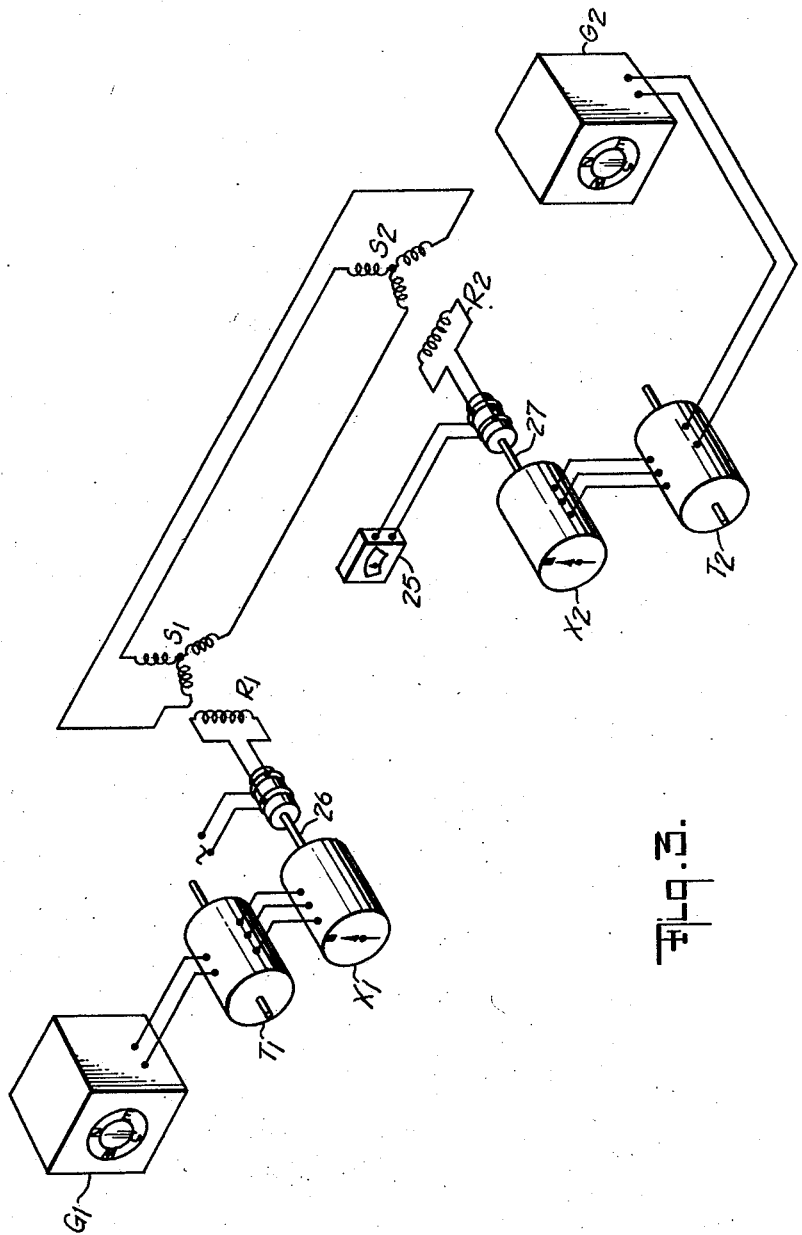
Fig. 3 is the system of Fig. 2 in which the error of isogonalisation is evaluated at the final azimuth shafts of the system, i. e., the azimuth shaft of the remote indicators.

The arrangement shown in Fig. 3 is a duplicate system having gyro compasses G₁, G₂ transmitters T₁, T₂ and remote indicators X₁, X₂. An azimuth shaft 26 of remote indicator X₁ and an azimuth shaft 27 of remote indicator X₂ are coupled electrically to show any error of isogonalisation between the said shafts 26 and 27 in exactly the same way as arranged for the shafts 12 and 13 in Fig. 2. (Integers similar to those shown in Fig. 2 carry the same reference letters and numerals.)

It will be appreciated that in a system such as that shown in Fig. 2 any idiosyncrasies of remote indicator X₁ and/or X₂ will not cause the error indicator 25 to record error of isogonalisation of the same remote indicators X₁, X₂ (assuming that G₁, G₂, T₁, T₂ are providing accurate azimuthal data). Since it is possible that G₁, G₂, T₁, T₂ are not the instruments normally observed, then this may be a serious matter. In Fig. 3 however, the error of isogonalisation is dependent entirely on the behaviour of the azimuthal shafts 26 and 27 of the remote indicators per se.

Figure 4:
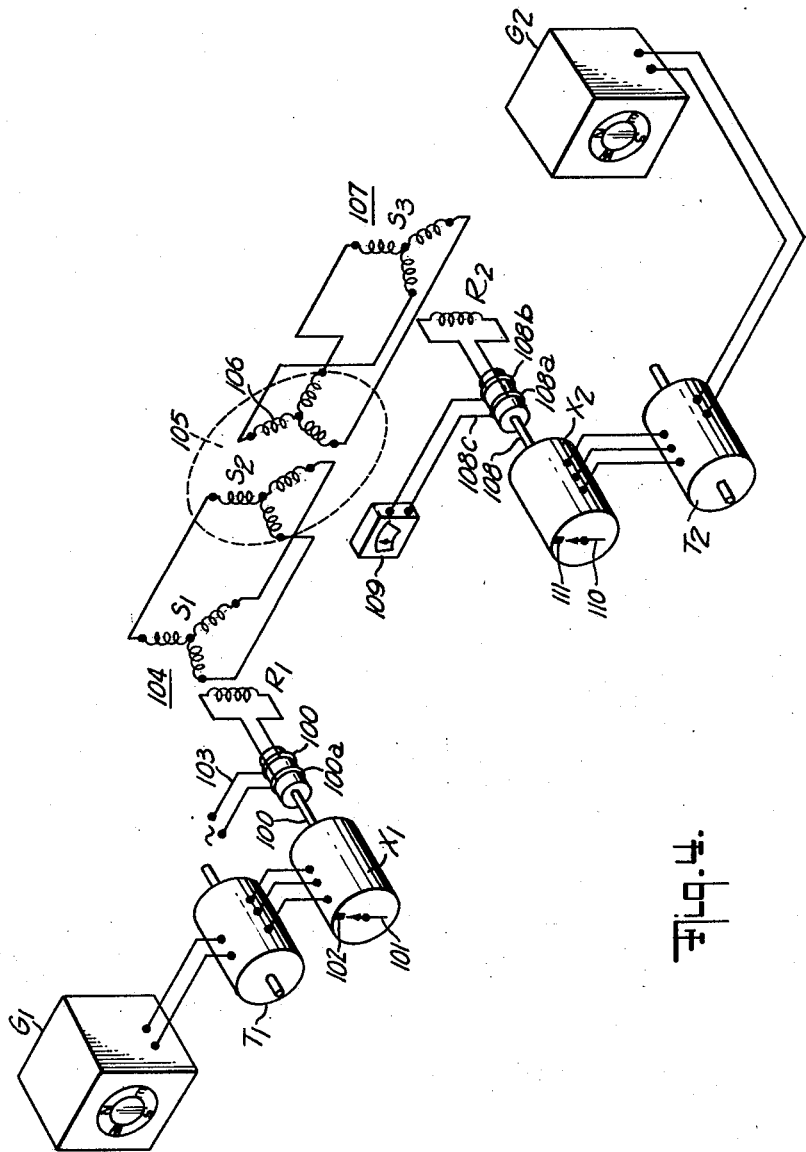
Figs. 4, 5, 6 and 7 show ways in which the schemes of Figs. 1, 2 and 3 may be effected using an angular electrical change of 90°.

Referring now to Fig. 4 there is shown a double gyrocompass equipment. Two identical gyro compasses G₁, G₂ acting as primary instruments, provide data regarding the position of their azimuth shafts to the azimuth shafts of transmitters T₁, T₂. The transmitters transmit data regarding the position of their azimuth shafts to remote repeater instruments X₁, X₂. These two sets of identical equipment are situated in one craft and it is desirable to provide a warning should there be any error of isogonalisation in the azimuth shaft of the remote repeaters X₁, X₂. The azimuth shaft of remote repeater X₁ is provided with a pointer 101 in alignment with a fixed index mark 102. Slip rings 100a, 100b fixed to shaft 100 are supplied with an alternating voltage through the brushes 103 and this energises the rotor R₁ of the transmitter synchro shown generally at 104. The stator S₁ of the transmitter synchro 104 supplies a signal in the form of three-line voltages which vary sinusoidally with the position of the rotor R₁ to the stator S₂ of a differential synchro shown by the dotted circle 105, thereby reproducing the direction of the transmitter flux in the stator S₂. This stator S₂ energises the three-phase rotor 106 of the differential synchro shown in the dotted circle 105, but it will be noted that the windings of the rotor 106 has been given an angular change of 90° with respect to the windings of the stator S₂. Consequently the flux which is produced in the stator S₃ of the receiver synchro shown generally at 107 has suffered a 90° change relative to that generated at stator S₁ or in other words the signal from S₁ has been changed 90° prior to its injection into stator S₃. The stator flux on S₃ links the rotor R₂ of the receiver synchro 107 which acts as a transformer generating a signal voltage which is fed through slip rings 108a, 108b and brushes 108c to an error of isogonalisation indicator 109. The rotor R₂ is attached to a shaft 108 provided with a pointer 110 and a fixed reference line 111. It will be appreciated that if the rotors R₁ and R₂ are positioned such that the pointers 101 and 110 are aligned with their index lines 102 and 111 and the orientation of R₁ with S₁ is identical with the orientation of R₂ with S₃, then no error signal will be generated in R₂ (this being the null position as shown in Fig. 4), and the error of isogonalisation indicator 109 will read zero. Consider the case, however, where the shaft 100 and its pointer 101 have moved an angle $\alpha$ away from the reference line 102 and in similar fashion the shaft 108 with its pointer 110 has also moved an angular distance $\alpha$ away from the reference line 111. Again there is no error of isogonalisation and the indicator 109 will read zero.

Consider now the case where the shaft 100 has rotated such that the pointer 101 makes an angle $\theta$ with index 102 and the shaft 108 has rotated such that pointer 110 makes an angle $\phi$ with index 111, where angle $\theta$ is not equal to angle $\phi$; then the voltage appearing at the slip rings 108a, 108b will be proportional to the sine of the difference between $\theta$ and $\phi$ and this will give an indication of the error of isogonalisation of the shaft 100 and 108 on the indicator 109.

It will be appreciated that the transmitter synchro 104 and the transmitter synchro 107 may be identical synchros in that their stators S₁, S₃ and rotors R₁, R₂ are identically orientated and the null position is arrived at when the orientation is the same for the transmitter synchro and the receiver synchro. This is so in that the differential synchro 105 adds in a 90° change to the signal from stator S₁ before it is injected into stator S₃.

Figure 5:
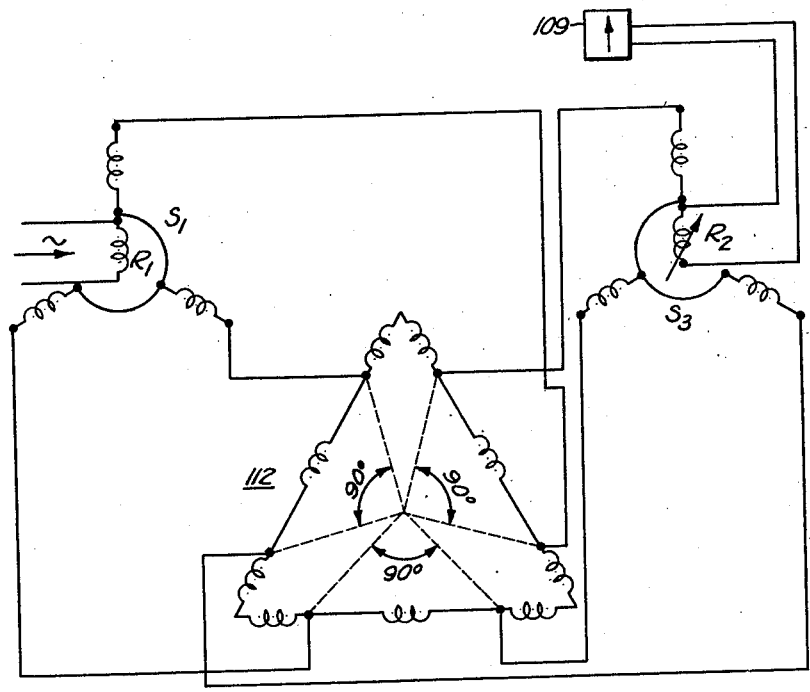
Figure 6:
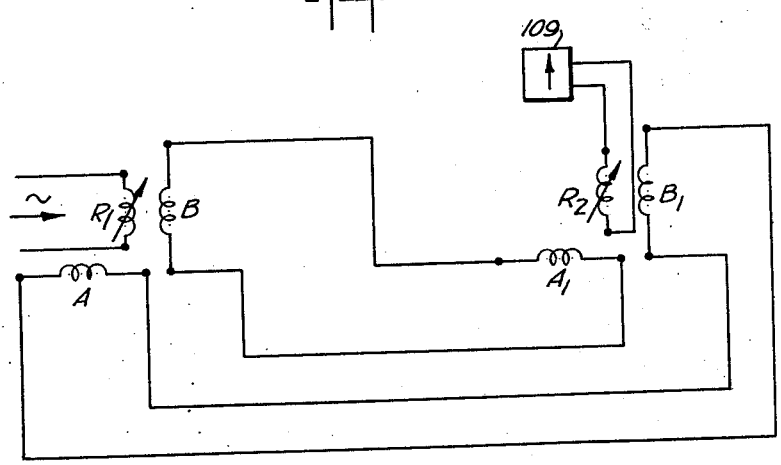

Figs. 5 and 6 show simplified electrical diagrams of two other ways in which the 90° change of signal may be effected. In Fig. 5 this stator S₁ (of Fig. 4) is connected to three similar autotransformers shown generally at 112. Connections are taken from the autotransformers to the stator S₃ (of Fig. 4). It will be noted that the three similar autotransformers are delta connected.

In Fig. 6 a two phase system is shown which provides an economical and highly satisfactory way of obtaining the 90° change of signal. The rotor R₁ (of Fig. 4) has a pair of resolver stators A and B and these are cross connected with similar stators AB which provide a flux to link the rotor R₂ (of Fig. 4). In this way the signal from the synchro transmitter AB is given a 90° change before it is injected into the stator of the synchro generator AB.

Figure 7:
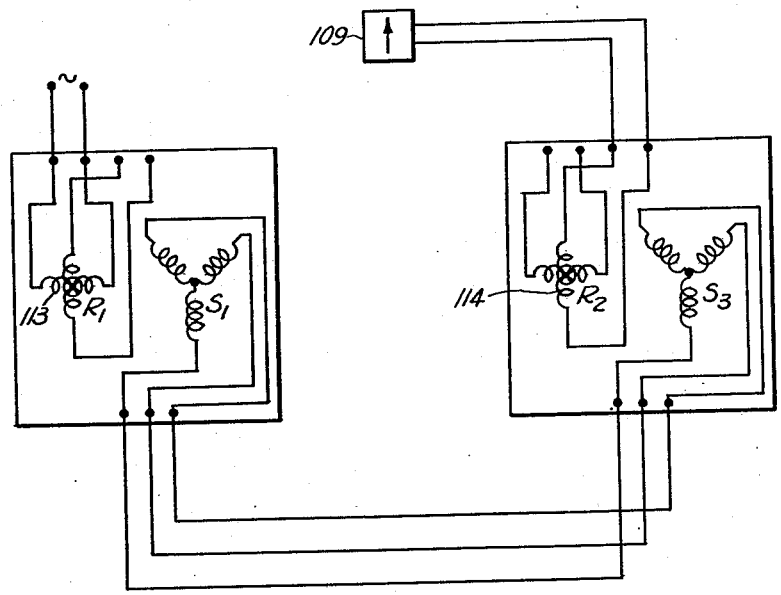

Finally in Fig. 7 we show two identical synchros having two phase wound rotors and three phase stators. One phase 113 of two phase rotor R₁ is energised and the output to the error of isogonalisation indicator 109 is taken from one phase 114 of two phase rotor R₂ displaced 90° from the phase used on two phase rotor R₁. In this manner the synchros of Fig. 7 may be used to operate in a scheme as shown in Fig. 4.

We claim:

An isogonal error detecting system including a primary angular position data providing reference device, a secondary independent reference device providing data of the character supplied by the primary reference device, a first data transmitting synchro operated by said primary reference device, a second data transmitting synchro operated by said secondary reference device, a first angular position data indicating synchro receiving the output of said first transmitting synchro having a rotor, a second angular position data indicating synchro receiving the output of said second transmitting synchro having a rotor, differential means including an electrical transmitter with an input from the rotor of the first data indicating synchro, an electrical receiver for the output of said transmitter with an input from the rotor of the second data indicating synchro, and means for detecting the error of isogonalisation between the rotors of the respective indicating synchros of the system operated by the output of the electrical receiver of the differential means.

References Cited in the file of this patent

UNITED STATES PATENTS

| | | |
|---|---|---|
| 798,236 | Usener | Aug. 29, 1905 |
| 1,895,240 | Vopel et al. | Jan. 24, 1933 |
| 2,153,264 | McNeil | Apr. 4, 1939 |
| 2,231,133 | MacNeil | Feb. 11, 1941 |
| 2,405,568 | Ferrill | Aug. 13, 1946 |
| 2,432,772 | Lear | Dec. 16, 1947 |
| 2,484,374 | Cahen et al. | Oct. 11, 1949 |